(12) United States Patent
McDonald et al.

(10) Patent No.: US 7,280,376 B2
(45) Date of Patent: Oct. 9, 2007

(54) PRIMARY SIDE VOLTAGE SENSE FOR AC/DC POWER SUPPLIES CAPABLE OF COMPENSATION FOR A VOLTAGE DROP IN THE SECONDARY

(75) Inventors: Brent A. McDonald, Round Rock, TX (US); Daniel E. Jenkins, Bastrop, TX (US)

(73) Assignee: Dell Products L.P., Round Rock, TX (US)

( * ) Notice: Subject to any disclaimer, the term of this patent is extended or adjusted under 35 U.S.C. 154(b) by 123 days.

(21) Appl. No.: 10/966,785

(22) Filed: Oct. 15, 2004

(65) Prior Publication Data

US 2006/0083032 A1    Apr. 20, 2006

(51) Int. Cl.
*H02M 3/335* (2006.01)
*G05F 5/00* (2006.01)

(52) U.S. Cl. .................. 363/20; 323/299; 363/21.12

(58) Field of Classification Search ............ 363/21.12, 363/21.13, 21.14, 21.18, 20, 18, 19, 24, 74, 363/79, 80; 323/907, 299, 301
See application file for complete search history.

(56) References Cited

U.S. PATENT DOCUMENTS

| | | | |
|---|---|---|---|
| 5,638,262 A | | 6/1997 | Brown |
| 5,717,578 A | * | 2/1998 | Afzal ......................... 320/111 |
| 5,757,625 A | * | 5/1998 | Schoofs ................... 363/21.13 |
| 5,815,380 A | * | 9/1998 | Cuk et al. ..................... 363/16 |
| 5,841,643 A | * | 11/1998 | Schenkel ................. 363/21.13 |
| 5,844,787 A | * | 12/1998 | Fraidlin et al. .......... 363/21.12 |
| 5,960,207 A | | 9/1999 | Brown |
| 6,049,471 A | * | 4/2000 | Korcharz et al. ............. 363/20 |
| 6,275,018 B1 | * | 8/2001 | Telefus et al. .............. 323/282 |
| 6,385,059 B1 | * | 5/2002 | Telefus et al. ........... 363/21.15 |
| 6,597,588 B2 | * | 7/2003 | Matsumoto .............. 363/21.08 |
| 6,700,365 B2 | * | 3/2004 | Isham et al. ................ 323/317 |
| 6,717,388 B2 | * | 4/2004 | Smidt et al. ................ 323/271 |
| 6,809,678 B2 | * | 10/2004 | Vera et al. .................. 341/166 |
| 6,853,563 B1 | * | 2/2005 | Yang et al. .............. 363/21.15 |
| 6,956,753 B1 | * | 10/2005 | Ananias ........................ 363/80 |
| 6,958,920 B2 | * | 10/2005 | Mednik et al. ............... 383/19 |
| 6,972,969 B1 | * | 12/2005 | Shteynberg et al. ...... 363/21.12 |
| 2003/0107358 A1 | * | 6/2003 | Isham et al. ................ 323/283 |

* cited by examiner

*Primary Examiner*—Karl Easthom
*Assistant Examiner*—Harry Behm
(74) *Attorney, Agent, or Firm*—Haynes and Boone, LLP (57) ABSTRACT

In a method and system for providing isolated power, a flyback controller includes a transformer operable to receive a primary voltage input and generate a secondary voltage output. A switch electrically coupled in series with a primary side of the transformer receives a control signal for controlling a duty cycle of the primary voltage. A controller is operable to generate the control signal responsive to receiving a plurality of inputs from the primary side. The controller regulates the secondary voltage output without receiving feedback input from a secondary side of the transformer by computing the secondary voltage as a predefined function of the plurality of the inputs when the switch is open.

13 Claims, 6 Drawing Sheets

PRIMARY SIDE VOLTAGE SENSE FOR AC/DC POWER SUPPLIES CAPABLE OF COMPENSATION FOR A VOLTAGE DROP IN THE SECONDARY

BACKGROUND

The present disclosure relates generally to the field of power supplies for information handling systems, and more particularly to techniques for efficiently controlling a direct current to direct current (DC-DC) converter used in alternating current (AC) to direct current (DC) isolated power supplies.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is typically required that power supplies providing power to the IHS, or components thereof, be isolated. That is, the AC/DC power supply output needs to be isolated from its input. Switching regulators such as a pulse width modulator (PWM) based controller have been widely used to cross the ground boundary between the primary and secondary side of a transformer for efficiently providing the isolated power output. However, it is difficult and costly to control switches referenced to the ground on the primary side in order to control the voltage output on the secondary side. By definition, this requires feedback of the voltage output on the secondary side to be translated to switch action on the primary side, while maintaining isolation between the primary and secondary sides.

Traditional AC/DC power supplies have utilized flyback converters with feedback elements such as optical ('opto') couplers and transformers to accomplish the isolation. However, opto couplers tend to have variable gains, which make their performance difficult to predict and control. As a result, they are prone to component failures, thereby having lower reliability. Gate drive and current sense transformers improve the accuracy and reliability but are more costly.

In a flyback converter, the primary winding of the transformer supplies energy to the magnetic core during the on-time of the primary side switch. During the off-time of the switch, the magnetic core delivers energy to the secondary side. Traditionally, two types of operational modes are typically used in flyback converters—Continuous Current Mode (CCM) or Discontinuous Current Mode (DCM). In the DCM mode, the primary side switch is turned on only when the secondary current has reached zero. In CCM mode, the primary side switch is turned on when secondary current is still above zero. As an example of a flyback converter based on a DCM device, iWatt Corporation, 90 Albright Way, Los Gatos, Calif. 95032-1827, USA, provides an iW2201 controller capable of DCM control. A product specification sheet published by iWatt Corporation, and entitled, 'iW2201 Digital Offline Power Supply Controller', Preliminary Data, Revision 1.7, describes one such isolated AC/DC power supply for powering the IHS and is incorporated, herein, by reference.

However, many traditional AC/DC power supplies based on the flyback converter design and utilizing the DCM may not be usable in power applications in which the secondary current may never reach zero. Also, DCM based control typically limits the power output of the AC/DC power supply and is less efficient. For the same output power, the peak current and the equivalent root mean square (RMS) current in CCM are lower than those in DCM operation. Thus, the conduction loss on the primary switch and secondary rectifier diode is less in the CCM compared to that in DCM, thereby increasing the total efficiency of the power supply.

Therefore, a need exists for improved power output and efficiency of isolated power supplies providing power to the IHS. More specifically, a need exists to develop tools and techniques for improving power output, efficiency and accuracy of flyback converters. Accordingly, it would be desirable to provide tools and techniques for an improved flyback converter providing isolated power to an IHS absent the disadvantages found in the prior methods discussed above.

SUMMARY

The foregoing need is addressed by the teachings of the present disclosure, which relates to a system and method for an improved isolated power supply providing power to an IHS. According to one embodiment, in a method and system for providing isolated power, a flyback controller includes a transformer operable to receive a primary voltage input and generate a secondary voltage output. A switch electrically coupled in series with a primary side of the transformer receives a control signal for controlling a duty cycle of the primary voltage. A controller is operable to generate the control signal responsive to receiving a plurality of inputs from the primary side. The controller regulates the secondary voltage output without receiving feedback input from a secondary side of the transformer by computing the secondary voltage as a predefined function of the plurality of the inputs when the switch is open.

In one embodiment, the method for controlling a flyback converter includes receiving a plurality of inputs from a primary side of a transformer of the converter. A secondary voltage output of the transformer is computed as a predefined function of the plurality of the inputs. A duty cycle of a primary voltage input of the transformer is controlled to control the secondary voltage output. The duty cycle is controlled by operating a switch coupled in series with the primary side in response to receiving the plurality of the inputs.

Several advantages are achieved by the method and system according to the illustrative embodiments presented herein. The embodiments advantageously provide for a system and method for an improved isolated power supply, since the flyback converter includes a technique to control the secondary voltage output without receiving feedback input from a secondary side of the transformer. This advantageously reduces cost and improves performance by not requiring costly and less reliable components such as opto couplers for the feedback loop. The secondary voltage is computed as a predefined function of the plurality of the inputs received from the primary side when the switch is open. The computed value of the secondary voltage includes corrections for errors due to drop in voltages on the secondary side and adjustments for temperature variation, thereby improving the accuracy of the flyback converter.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip), firmware (including application specific integrated circuits and programmable chips) and/or software or a combination thereof, depending on the application requirements.

It is typically required that power supplies be isolated. Traditional solutions based on use of flyback converters with opto couplers and/or gate drive and current sense transformers are generally difficult to control and/or are costly. It would be desirable to improve the efficiency and power output of flyback converters. The problem of lower efficiency, lower power output and reduced accuracy may be advantageously eliminated by using a continuous current mode (CCM) of operation and deploying error compensation techniques to compensate for voltage losses on the secondary side of the transformer. This technique provides isolation for the power supply without receiving feedback input from the secondary side.

According to one embodiment for providing isolated power, a flyback controller includes a transformer operable to receive a primary voltage input and generate a secondary voltage output. A switch electrically coupled in series with a primary side of the transformer receives a control signal for controlling a duty cycle of the primary voltage. A controller is operable to generate the control signal responsive to receiving a plurality of inputs from the primary side. The controller regulates the secondary voltage output without receiving feedback input from a secondary side of the transformer by computing the secondary voltage as a predefined function of the plurality of the inputs when the switch is open.

Figure 1:
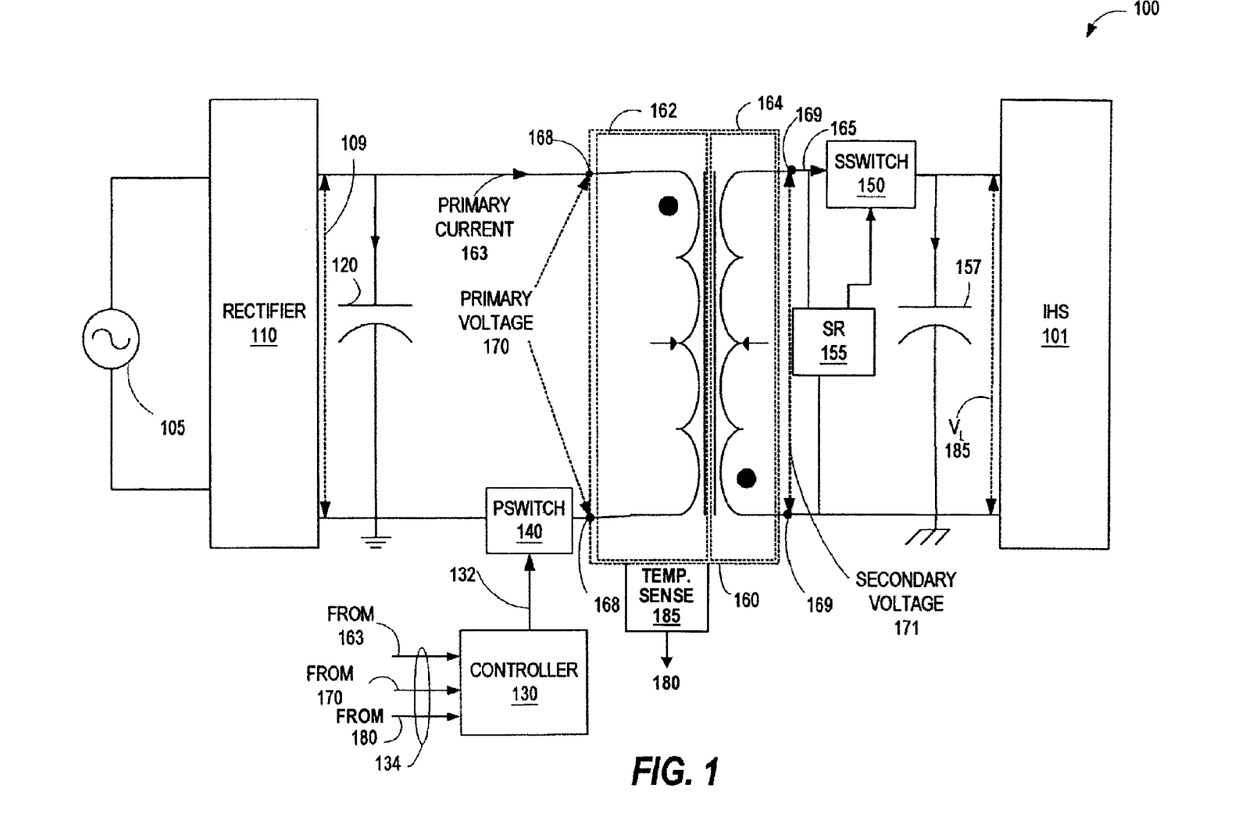
FIG. 1 illustrates an improved flyback converter for providing isolated power to a load, according to one embodiment.

FIG. 1 illustrates an improved flyback converter 100 for providing isolated power to a load, according to one embodiment. The converter 100 includes the following components: a) a rectifier 110, b) an input capacitor 120, c) a controller 130, d) a primary switch 140, e) a secondary switch 150, f) a secondary synchronous rectifier 155, g) an output capacitor 157, a transformer 160, and i) a temperature sensor 185.

In one embodiment, the transformer 160 includes a coupled inductor having a primary side 162 electro-magnetically coupled to a secondary side 164. The primary side 162 is electrically coupled in series with the primary switch 140. A primary current 163 flows through the primary side 162 and a primary voltage 170 is measured across a pair of input terminals 168 of the primary side 162. The secondary side 164 is electrically coupled to the load through the secondary switch 150. A secondary voltage 171 is computed across a pair of output terminals 169 of the secondary side 164. A secondary current 165 flows through the secondary side 164. In the depicted embodiment, the load is an IHS 101. In this embodiment, the polarity of the pair of input terminals 168 is opposite that of the pair of output terminals 169 due to the electro-magnetic coupling characteristics of the transformer 160. In one embodiment, each of the switches 140 and 150 is a MOSFET device.

In one embodiment, the rectifier 110 is an AC-DC full-bridge rectifier device (not shown), which provides a charge current to the input capacitor 120. The input signal 105 may be an AC power input, which is generally received from a 120 V, 60 Hertz or 220 V, 50 Hertz signal source from a wall outlet. The intermediate output 109 is a DC signal, which may vary within a predefined DC voltage range. For example, in one embodiment, the intermediate output 109 varies approximately between zero to 160 volts. In some applications, the ripple voltage may be relatively small such as approximately 5-10V.

The primary switch 140 is operable to control the flow of the primary current 163. When the primary switch 140 is in a closed (or on) position, the primary current 163 flows through the primary side 162. The secondary current 165 is zero since the polarity of voltage across the pair of output terminals 169 causes the secondary switch 150 to be reversed biased. When the primary switch 140 is in an open (or off position), the primary current 163 is zero and the energy stored in core of the transformer 160 is transferred to the secondary side 164. The switching of the polarity of voltage across the pair of output terminals 169 now causes the secondary switch 150 to be forward biased, thereby enabling the secondary current 165 to charge the output capacitor 157. The secondary synchronous rectifier 155 controls the operation of the secondary switch 150.

The controller 130 is operable to control the operation (e.g., on or off) of the primary switch 140, via a control signal 132, in response to receiving a plurality of inputs 134. The duration of the on or off state controls a duty cycle of the primary voltage 170. The secondary voltage 171 is a function of an inductance L of the transformer 160, a switching frequency, a forward resistance of the secondary switch 150 and the duty cycle. Thus, by controlling the duty cycle and keeping the values of the inductance, the switching frequency and the forward resistance fixed, the controller 130 controls the secondary voltage 171. In one embodiment, the switching frequency may be selectable from a range of frequencies.

In one embodiment, the controller 130 adjusts the duty cycle in response to changes in the load current. A continuous conductance mode (CCM) of operation is maintained when the secondary current 165 of the transformer 160 is greater than zero. In the CCM mode, the total energy in the core of the transformer is not drained completely and a residual amount of energy is retained. Additional details of the waveforms associated with the converter 100 are described in FIGS. 3A and 3B.

In one embodiment, the plurality of inputs 134 is received from the primary side 162 and includes: 1) the primary current 163, 2) the primary voltage 170 and 3) a temperature input 180 indicative of the temperature measurement of the converter 100, including the transformer 160, as measured by the temperature sensor 185. In one embodiment, the controller 130 computes the secondary voltage 171 as a predefined function of the plurality of the inputs 134 when the primary switch 140 is open. The control signal 132 is adjusted accordingly to vary the duty cycle required to generate the computed value of the secondary voltage 171. Thus, the controller 130 is operable to control the secondary voltage 171 without utilizing feedback inputs received from the secondary side 164.

In one embodiment, the predefined function is a proportional function. That is, the secondary voltage 171 ($V_{OUT}$) is proportional to the primary voltage 170 ($V_{IN}$), a turns ratio ($N_S/N_P$) of the transformer 160 and the duty cycle (D). In one embodiment, a positive peak voltage of the secondary voltage 171 is expressed by an equation 100.

$$V_{OUT} = V_{IN} * (N_S/N_P) * (D/(1-D)) \quad \text{Equation 100}$$

Thus, the secondary voltage 171 is controlled by controlling the duty cycle.

Figure 2:
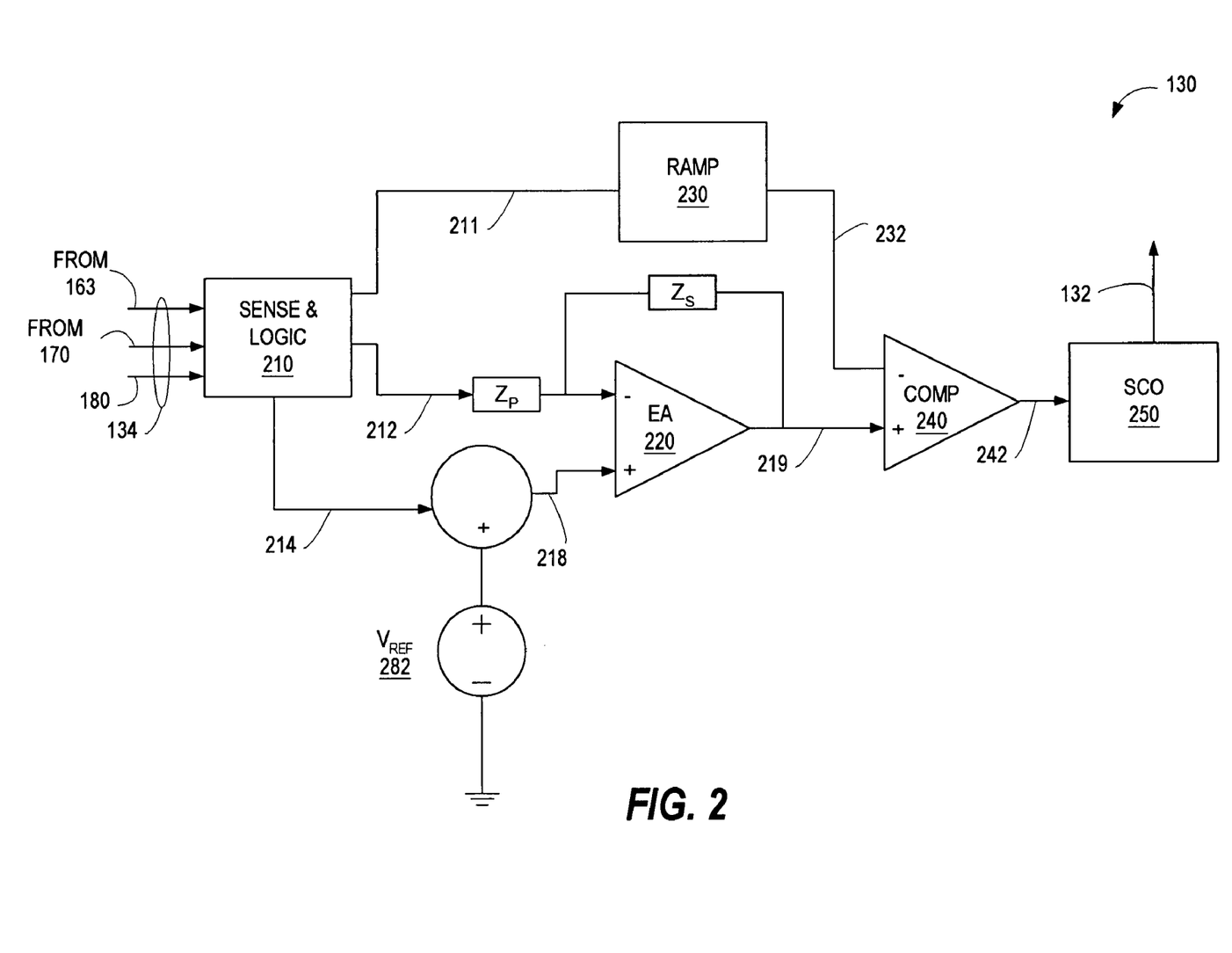
FIG. 2 is a block diagram illustrating additional detail of the controller 130 of FIG. 1, according to one embodiment.

However, a load voltage 185 ($V_L$) applied to the load IHS 101 is slightly less than the secondary voltage 171 due to an error introduced as a result of voltage drops across components included in the secondary side 164. Impedances of components in the conduction path such as transformer winding resistance of the secondary side 164, on resistance of the secondary switch 150, resistance of the conductor traces on a printed circuit board and the temperature all contribute to the error. The load voltage 185 ($V_L$) is expressed by the equation 200.

$$V_L = V_{IN} * (N_S/N_P) * (D/(1-D)) - V_{ERR} \quad \text{Equation 200}$$

where $V_{ERR}$ is the error due to the voltage drops. Additional detail of implementing the equation 200 in the controller 130 for controlling the secondary voltage 171 and hence the load voltage 185 ($V_L$) is described in FIG. 2.

FIG. 2 is a block diagram illustrating additional detail of a controller 130 of FIG. 1, according to one embodiment. In the depicted embodiment, the controller 130 includes following components: a) a sense and logic circuit 210, b) an error amplifier 220, c) a ramp generator 230, d) a comparator 240, and e) a switch control output circuit 250. The sense and logic circuit 210 is operable to receive the plurality of inputs 134 and generate a plurality of computed outputs including a first computed output 212 and a second computed output 214. The first and second computed outputs 212 and 214 are used to generate the control signal 132 for adjusting the duty cycle.

In one embodiment, the first computed output 212 is computed as the primary voltage 170 input multiplied by the turns ratio of the transformer 160. In one embodiment, the second computed output 214 is computed by adding impedances of the components included in the secondary side 164. For example, by adding resistances of the secondary winding of the transformer, the conductor path to the load, and the secondary switch 150 to compute a combined resistance of the secondary side 164. The combined resistance is then multiplied by the primary current 163 flowing through the primary side 162 and the turns ratio to compute the secondary voltage 171 output.

In one embodiment, the second computed output 214 is indicative of the error $V_{ERR}$ in equation 200. The second computed output 214 (or $V_{ERR}$) is expressed by an equation 300 or 301.

$$V_{ERR} = I_S * (N_P/N_S) * (R_{DS\_ss} + R_S + R_{PCB}) \quad \text{Equation 300}$$

or $$V_{ERR} = I_P * (N_P/N_S)^2 * (R_{DS\_ss} + R_S + R_{PCB}) \quad \text{Equation 301}$$

where $V_{ERR}$ is the secondary error voltage referred to the primary, $I_S$ is the secondary current 165, $I_P$ is the primary current 163, $R_{DS\_SS}$ is the forward resistance of the secondary switch 150, $R_S$ is the resistance of the secondary windings of the transformer 160 and $R_{PCB}$ is the conductor resistance. The value of Is 165 is $N_P/N_S$ the value of $I_P$ 163 at the time of the change of state of the primary switch 140. Thus, value of $V_{ERR}$ is computed. In one embodiment, the value of $V_{ERR}$ is kept to a minimum by selecting a MOSFET device having a lower 'on' or forward resistance compared to a diode. The resistance values are a function of the temperature input 180 and may be computed as a look up table and/or by an equation.

In one embodiment, the second computed output 214 is subtracted from a voltage reference source $V_{REF}$ 282 to compute a third computed output 218. The $V_{REF}$ 282 is a target or reference value desired for the load IHS 101. The error amplifier 220 is operable to amplify the difference between the third computed output 218 and the first computed output 212 to generate an output VE 219 used for triggering the duty cycle.

In one embodiment, the sense and logic circuit 210 generates a signal $V_1$ 211 for implementing current mode control. In one embodiment, $V_1$ 211 is a ramp signal indicative of the primary current 163. In one embodiment, the generation of $V_1$ 211 may be an option. The $V_1$ 211 signal is summed with the ramp generator 230 to generate a ramp shaped waveform 232 having a selectable frequency. In one embodiment, at least one of $V_1$ 211 or the ramp generator 230 is enabled. The comparator 240 triggers an output 242 to change state of the primary switch 132 when a value of the $V_E$ 219 exceeds the value of the waveform 232.

In one embodiment, the switch control output circuit 250 is operable to receive the output 242 of the comparator 240 and generate the control signal 132. The switch control output circuit 250 may include a latch (not shown) and a clock source (not shown) for generating the control signal 132.

Figure 3A:
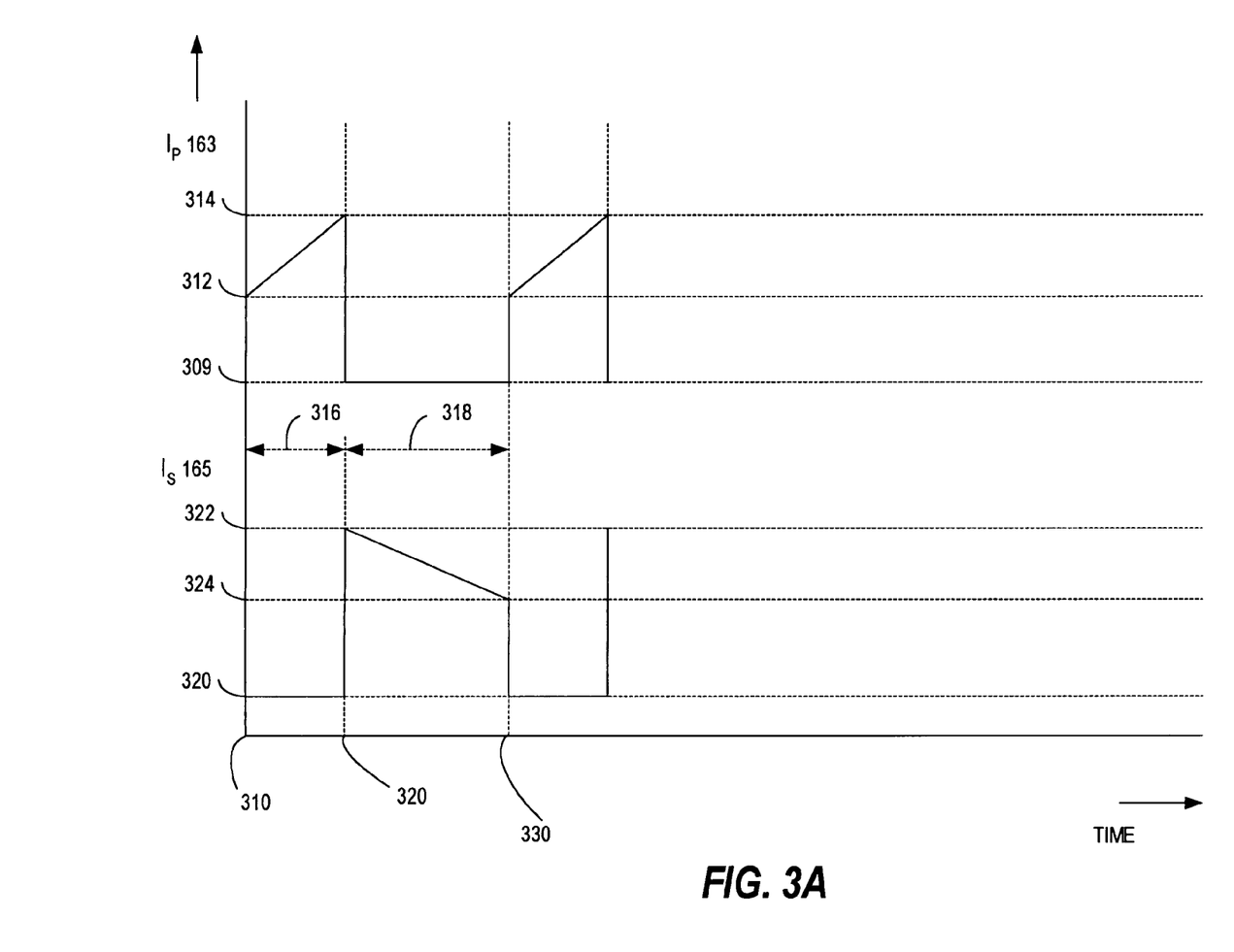
FIG. 3A illustrates waveforms associated with the flyback converter 100 of FIG. 1, according to one embodiment.

FIG. 3A illustrates waveforms associated with the flyback converter 100 of FIG. 1, according to one embodiment. In this illustration, at time $t=t_0$ 310, the primary switch 140 is closed and the primary current 163 ($I_P$) increases from an initial value $I_1$ 312 to an increased value of $I_2$ 314 amps. The time duration for which the primary current 163 continues to increase is a $t_{ON}$ 316 period of the duty cycle. At $t=t_1$ 320, the primary switch 140 is opened and the primary current 163 drops to $I_0$ 309. Due to the forward bias on the secondary switch 150, the secondary current 165 ($I_S$) starts from an initial value of $I_{S1}$ 322, which is the same value of $I_P$ (e.g., $I_2$ 314) and decreases to a value $I_{S2}$ 324 until $t_2$ 330. In one embodiment, an average value of $I_S$ may be used (e.g., $(I_{S1} 322 + I_{S2} 324)/2$) in equation 200. Unlike the DCM mode of operation, the value of the secondary current 165 (Is) remains above zero while in the CCM mode of operation. At $t=t_2 330$, the primary switch 140 is closed and the cycle repeats. The time duration for which the secondary current 165 continues to decrease is a $t_{OFF}$ 318 period of the duty cycle.

Figure 3B:
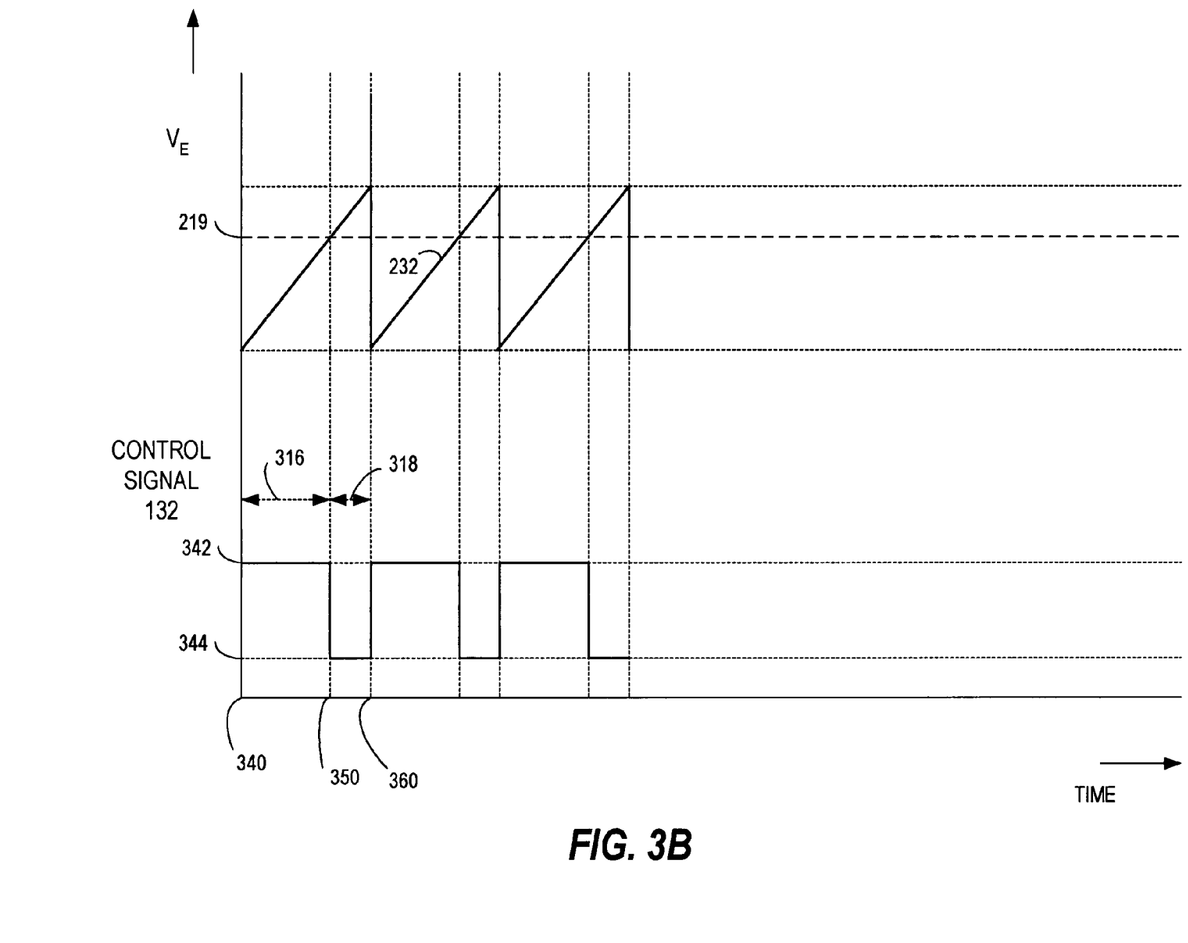
FIG. 3B illustrates waveforms associated with the controller 130 of FIG. 1, according to one embodiment.

FIG. 3B illustrates waveforms associated with the controller 130 of FIG. 1, according to one embodiment. In this illustration, at time $t=t_3 340$, the value of the output $V_E$ 219 error is greater than the value of the ramp shaped waveform 232 and the control signal 132 is enabled to turn the primary switch 140 to an on state 342 for the $t_{ON}$ 316 period. At $t=t_4 350$, the value of the output $V_E$ 219 error is less than or equal to the value of the waveform 232 and the control signal 132 is disabled to turn the primary switch 140 to an off state 344 for the $t_{OFF}$ 318 period. At $t=t_5 360$, the value of the output $V_E$ 219 error is greater the value of the waveform 232 and the control signal 132 is enabled to turn the primary switch 140 to an on state 342 and the cycle repeats. The output $V_E$ 219 changes dynamically in response to the plurality of inputs 134 and the control signal 132 is adjusted accordingly.

Figure 4:
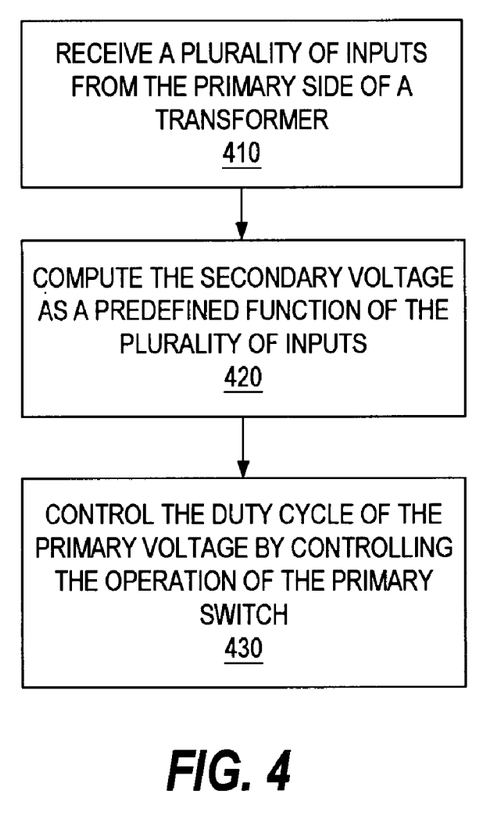
FIG. 4 is a flow chart illustrating a method for controlling the flyback converter 100 of FIG. 1, according to an embodiment.

FIG. 4 is a flow chart illustrating a method for controlling the flyback converter 100 of FIG. 1, according to an embodiment. In step 410, the plurality of inputs 134 are received from the primary side 162 of the transformer 160. In step 420, the secondary voltage 171 output of the transformer is computed as a predefined function of the plurality of the inputs 134. In step 430, a duty cycle of the primary voltage 170 input of the transformer 160 is controlled by the primary switch 140 in response to receiving the plurality of inputs 134. The secondary voltage 171 output is thus controlled by controlling the duty cycle.

Various steps described above may be added, omitted, combined, altered, or performed in different orders. For example, the step 420 may be divided into two steps (not shown), a first sub-step to generate a plurality of computed outputs 212 and 214 and a second sub-step to use the computed outputs 212 and 214 to computing the secondary voltage 171, according to one embodiment.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Figure 5:
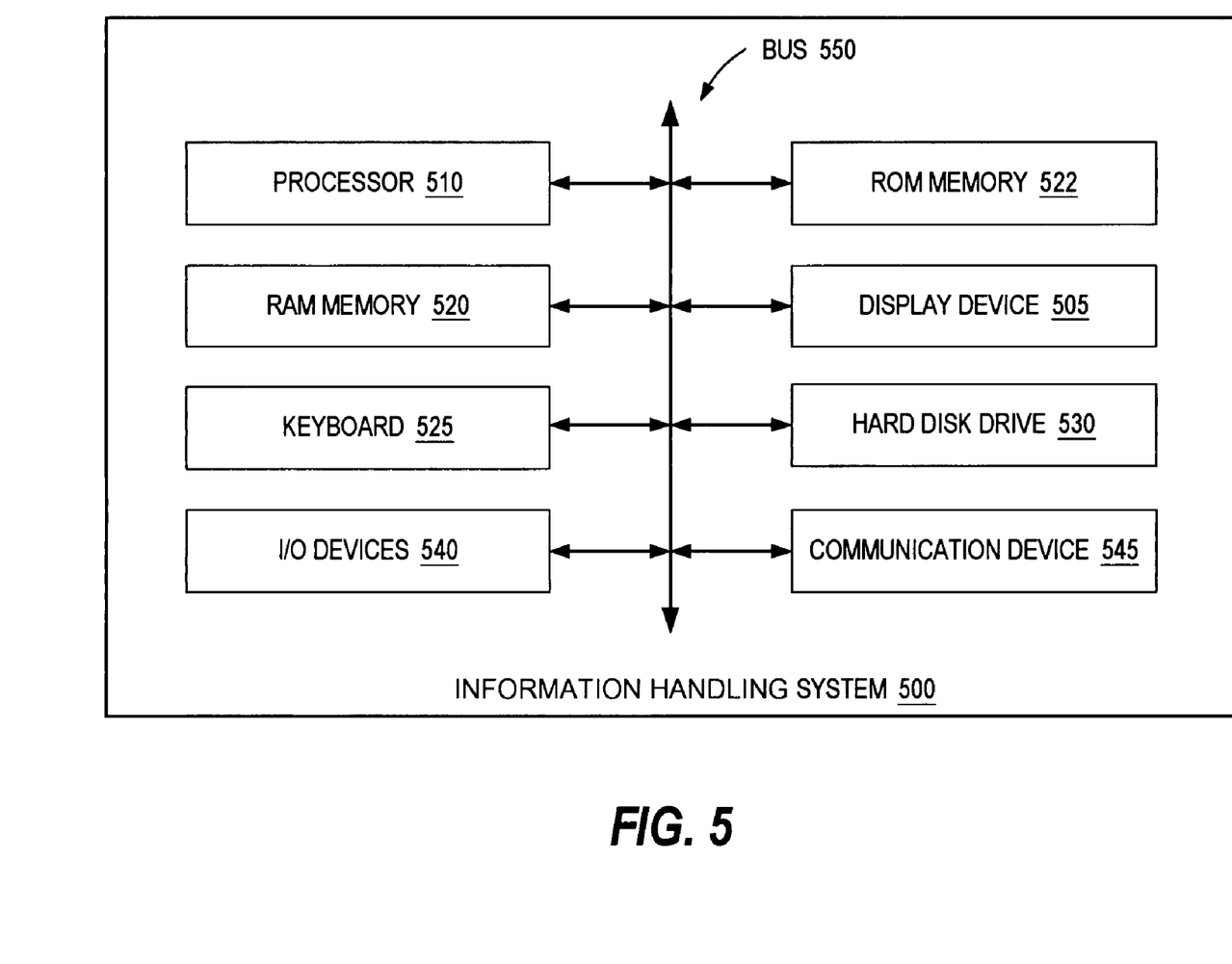
FIG. 5 illustrates a block diagram of an information handling system having an improved flyback converter, according to an embodiment.

FIG. 5 illustrates a block diagram of an information handling system 500 having an improved inverter, according to an embodiment. The information handling system 500 includes a processor 510, a system random access memory (RAM) 520 (also referred to as main memory), a non-volatile ROM 522 memory, a display device 505, a keyboard 525 and an I/O controller 540 for controlling various other input/output devices. It should be understood that the term "information handling system" is intended to encompass any device having a processor that executes instructions from a memory medium. The IHS 500 is shown to include a hard disk drive 530 connected to the processor 510 although some embodiments may not include the hard disk drive 530. The processor 510 communicates with the system components via a bus 550, which includes data, address and control lines. In one embodiment, the IHS 500 may include multiple instances of the bus 550. A communications controller 545, such as a network interface card, may be connected to the bus 550 to enable information exchange between the IHS 500 and other devices (not shown).

In one embodiment, a power supply system (not shown) providing power to the IHS 500 incorporates the flyback converter 100 (not shown) described in FIG. 1. In one embodiment, the load IHS 101 is implemented as the IHS 500.

The processor 510 is operable to execute the computing instructions and/or operations of the IHS 500. The memory medium, e.g., RAM 520, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC).

Although illustrative embodiments have been shown and described, a wide range of modification, change and substitution is contemplated in the foregoing disclosure and in some instances, some features of the embodiments may be employed without a corresponding use of other features. For example, the use of primary side based inputs and techniques for compensating errors, described herein, may also be applied for controlling other isolated power supplies. This advantageously leads to cost reductions by eliminating the need for feedback elements on the secondary side. Accordingly, it is appropriate that the appended claims be construed broadly and in a manner consistent with the scope of the embodiments disclosed herein.

What is claimed is:

1. A flyback converter comprising:
a transformer operable to receive a primary voltage input and generate a secondary voltage output;
a switch electrically coupled in series with a primary side of the transformer, wherein the switch receives a control signal for controlling a duty cycle of the switch; and
a controller operable to generate the control signal responsive to receiving a plurality of inputs, the inputs comprising the primary voltage input, a primary current input, and a temperature input, the controller comprising a sense and logic circuit to calculate a first value, indicative of the secondary voltage output, from the primary voltage input, and a second value, indicative of an error in the secondary voltage output, from the primary current input and the temperature input, the controller using the first and second values to generate the control signal, the controller calculating the first value using a proportional function, wherein the first value indicative of the secondary voltage output is proportional to the primary voltage input, a turns ratio of the transformer and the duty cycle, wherein the second value indicative of an error in the secondary voltage output estimates drops in voltages across components included in a secondary side of the converter, and wherein the components include a secondary winding of the transformer, a conductor path to a load, and a synchronous rectifier switch.

2. The converter of claim 1, wherein the temperature input is based on a temperature measurement of the transformer.

3. The converter of claim 1, wherein the controller adjusts the duty cycle to enable a continuous conductance mode (CCM), wherein a secondary current of the transformer is greater than zero while operating in the CCM.

4. The converter of claim 1, wherein the second value is calculated by adding resistances of the secondary winding of the transformer, the conductor path to the load, and the synchronous rectifier switch to compute a combined resistance of the secondary side, wherein the combined resistance is multiplied by the primary current and the turns ratio.

5. The converter of claim 4, wherein the resistances are adjusted in response to the temperature input.

6. The converter of claim 1, wherein the controller includes a ramp generator circuit operable to generate a ramp signal having a selectable frequency, wherein the control signal is disabled when a value of the ramp signal is greater than a third computed output, wherein the third computed output regulates the secondary voltage output without receiving feedback from the secondary side.

7. The converter of claim 6, wherein the third computed output is computed as a function of the first value and the second being subtracted from a voltage reference defined for a load voltage.

8. A method for controlling a flyback converter, the method comprising:

providing a transformer operable to receive a primary voltage input and generate a secondary voltage output;

electrically coupling a switch in series with a primary side of the transformer, wherein the switch receives a control signal for controlling a duty cycle of the switch; and providing a controller operable to generate the control signal responsive to receiving a plurality of inputs, the inputs comprising the primary voltage input, a primary current input, and a temperature input, the controller comprising a sense and logic circuit to calculate a first value, indicative of the secondary voltage output, from the primary voltage input, and a second value, indicative of an error in the secondary voltage output, from the primary current input and the temperature input, the controller using the first and second values to generate the control signal, the controller calculating the first value using a proportional function, wherein the first value indicative of the secondary voltage output is proportional to the primary voltage input, a turns ratio of the transformer and the duty cycle, wherein the second value indicative of an error in the secondary voltage output estimates drops in voltages across components included in a secondary side of the converter, and wherein the components include a secondary winding of the transformer, a conductor path to a load, and a synchronous rectifier switch.

9. The method of claim 8, wherein the temperature input is based on a temperature measurement of the transformer.

10. The method of claim 8, wherein the duty cycle is controlled to enable a continuous conductance mode (CCM) of operation, wherein a secondary current of the transformer is greater than zero while operating in the CCM.

11. An information handling system (IHS) comprising:

a processor; and a flyback converter operable to provide power to the processor, the converter including:

a transformer operable to receive a primary voltage input and generate a secondary voltage output;

a switch electrically coupled in series with a primary side of the transformer, wherein the switch receives a control signal for controlling a duty cycle of the switch; and a controller operable to generate the control signal responsive to receiving a plurality of inputs, the inputs comprising a primary voltage input, a primary current input, and a temperature input, the controller comprising a sense and logic circuit to calculate a first value, indicative of the secondary voltage output, from the primary voltage input, and a second value, indicative of an error in the secondary voltage output, from the primary current input and the temperature input, the controller calculating the first value using a proportional function, wherein the first value indicative of the secondary voltage output is proportional to the primary voltage input, a turns ratio of the transformer and the duty cycle, wherein the second value indicative of an error in the secondary voltage output estimates drops in voltages across components included in a secondary side of the converter, and wherein the components include a secondary winding of the transformer, a conductor oath to a load, and a synchronous rectifier switch.

12. The system of claim 11, wherein the controller regulates the secondary voltage output without receiving voltage or current signals from a secondary side of the flyback converter.

13. The system of claim 11, wherein the temperature input is based on a temperature measurement of the transformer.

* * * * *

UNITED STATES PATENT AND TRADEMARK OFFICE
CERTIFICATE OF CORRECTION

PATENT NO. : 7,280,376 B2 Page 1 of 1
APPLICATION NO. : 10/966785
DATED : October 9, 2007
INVENTOR(S) : Brent A. McDonald et al.

It is certified that error appears in the above-identified patent and that said Letters Patent is hereby corrected as shown below:

Claim 11, Column 10, Line 45, delete "oath" and insert --path--.

Signed and Sealed this

Eighteenth Day of November, 2008

JON W. DUDAS
*Director of the United States Patent and Trademark Office*